Figure 1:
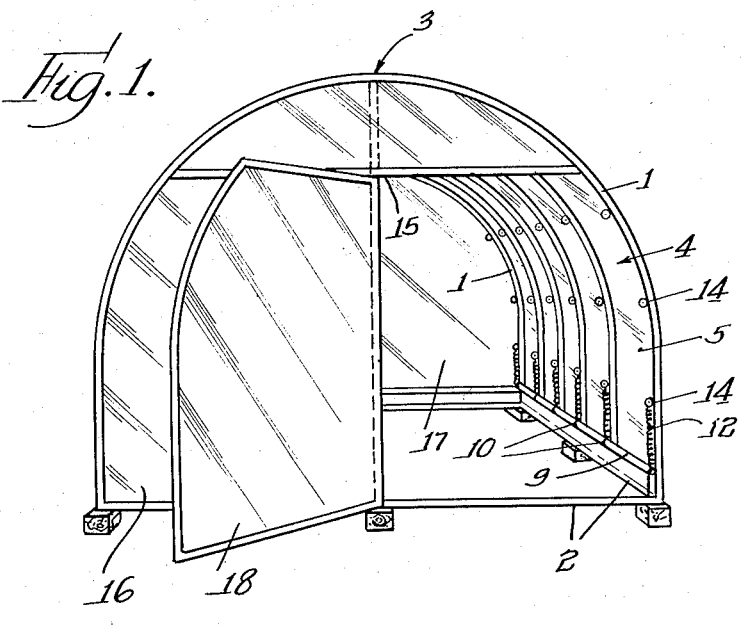

Jan. 20, 1959 T. S. HARKNESS 2,869,561
BUILDING STRUCTURE
Filed Nov. 13, 1956

INVENTOR.
Tom S. Harkness
BY
Wallenstein & Spangenberg
Attys.

United States Patent Office 2,869,561
Patented Jan. 20, 1959

2,869,561

BUILDING STRUCTURE

Tom S. Harkness, London, England

Application November 13, 1956, Serial No. 621,963

Claims priority, application Great Britain March 6, 1956

5 Claims. (Cl. 135—1)

This invention relates to an improved type of building structure and is particularly applicable to structures of the kind which are light in weight and can, therefore, be readily transported.

With the advent of so-called synthetic plastic sheet material such, for example, as polyvinylchloride and polythene, it has become possible to obtain sheets of these weatherproof and rotproof materials having sufficient length and width to enable them to be used for the actual "skin" or wall and roof covering over the framework of a building structure.

The transparent and translucent forms of these synthetic plastic sheet materials allow a greater amount of ultra violet rays to pass through than ordinary window glass and, in addition, they are somewhat cheaper than such glass, as well as having the further advantage that they can be handled much more roughly than glass without cracking or breaking.

These synthetic plastic sheet materials thus lend themselves to the ready production of a lightweight and transportable building which, in the case of transparent or translucent sheeting, is very convenient for use as a green house or a sun bathing hut or similar other temporary or permanent shelter, garage or like kind of shed or building.

In some cases, such as a beach hut or garage, it may be desirable to have the synthetic plastic sheet wall covering opaque and the roof transparent or translucent, and such opaque sheeting may conveniently be suitably coloured.

In the case of a greenhouse, the synthetic plastic sheet material has the advantage that it gives at least as much protection against frost as even thin window glass and has the further advantage that a lightweight greenhouse made of this material can be readily transported without any risk of damage or breakage of the synthetic plastic covering material.

The synthetic plastic sheet material has the further advantage that not only does it allow the building structure to be made light and transportable, but that should a break or tear occur in the sheet material it can be very readily repaired by patching in any convenient known manner.

In a building structure having a framework covered with sheeting made of synthetic plastic material there is, however, the problem of suitably fixing the sheeting to the framework; and particularly in the case of sheets of material of large area there is the additional disadvantage that the material tends to stretch in use, making it difficult to maintain a reasonable degree of tautness in the covering.

The principal object of this invention is to provide a construction which overcomes these drawbacks and enables the synthetic plastic sheet covering to be properly secured to the building framework and also to be maintained under sufficient tension at all times.

Briefly, according to the present invention, the supporting framework includes horizontal base frame members and the flexible synthetic plastic covering sheet overlies the framework and has its edges passing underneath the base frame members into the building structure. These edges of the covering sheet are formed into sleeves and battens are extended through the sleeves. A plurality of spring coupling members are connected at one end through holes in the sleeves to the battens for drawing the covering sheet taut over the framework. The other ends of the spring coupling members may be connected to the framework.

Further objects of this invention reside in the details of construction of the building structure and in the cooperative relationships between the component parts thereof.

Figure 2:
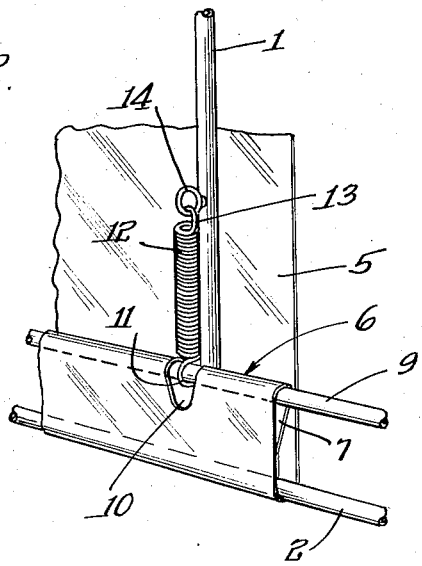

The accompanying drawing illustrates a specific embodiment of the invention, now to be described by way of example. In the drawing:

Fig. 1 is a perspective view of a building structure according to this invention, and Fig. 2 illustrates details of the method of maintaining the synthetic plastic covering sheet taut.

The portable type building structure includes a supporting framework having a plurality of vertically arranged inverted U-shaped frame members 1 of metallic tubing connected to a rectangular base having base frame members 2 also made of metallic tubing, the tubing being connected, in any convenient manner, such as by welding, but preferably by detachable pin and socket joints.

The main body of the structure including the roof 3 and sides 4, is covered by a covering sheet 5 of synthetic plastic material, such as polyvinylchloride or polythene, of large area which is positioned over the U-shaped frame members of the structure, and the side edges 6 thereof (Fig. 2) pass under the base frame members 2 and are pulled upwardly a short distance substantially parallel with the outer covering. These side edges 6 of the covering sheet 5 are provided with sleeves 7 which are formed by folding the edges back on the sheet 5 and welding or sewing them to the sheet in known manner.

Battens 9 of wood or metal are inserted in the sleeves 7 and holes 10 are made in the sleeve material at suitable distances along their lengths to give access to the battens 9 to which the ends 11 of spring coupling members 12 are connected. The other ends 13 of the spring coupling members 12, not connected to the battens 9, are detachably secured to ring or hook members 14 fitted to the inverted U-shaped frame members 1 of the framework so that the battens 9 may be drawn upwardly and with them the sleeves 7 of the covering sheet 5 so as to secure the covering sheet to the framework and give it a degree of tautness dependent upon the tension of the spring coupling members 12. The spring coupling members 12 are illustrated to be coil springs directly connected to the battens 9 and the ring or hook members 14, although they may take different forms. For example, the spring coupling members, in addition to including the coil spring 12, may also include chain lengths. Alternatively, the spring coupling members may be formed of elasticated cord or the like.

Preferably the inverted U-shaped frame members 1 at the ends of the building structure are provided with suitable covering to form end panels which, in turn, form end walls 16 and 17 for the building structure. One of the end walls, as for example, the end wall 16, may be provided with a door 18 for providing access into the building structure.

While the substantially U-shaped inverted frame members 1 have been illustrated in the shape of half hoops they could be substantially rectangular or of mansard style and also they may be provided with one or more tubes 15 connected along or across the framework to increase its rigidity.

While for purposes of illustration, one form of this invention has been disclosed, other forms thereof may become apparent to those skilled in the art upon reference to this disclosure and, therefore, this invention should be limited only by the scope of the appended claims.

I claim as my invention:

1. In a transportable type building structure, a supporting framework including horizontal base frame members, a flexible synthetic plastic covering sheet overlying the framework and having its edges passing underneath the base frame members into the building structure, said edges of the covering sheet being formed into sleeves, battens extending through the sleeves, and a plurality of spring coupling members connected at one end through holes in the sleeves to the battens for drawing the covering sheet taut over the framework.

2. In a transportable type building structure, a supporting framework including a plurality of vertically arranged inverted U-shaped frame members connected at their bottoms to a pair of base frame members, a flexible synthetic plastic covering sheet overlying the framework and forming the top and side walls of the building structure and having its side edges passing underneath the base frame members into the building structure, said side edges of the covering being formed into sleeves, battens extending through the sleeves, and a plurality of spring coupling members connected at one end through holes in the sleeves to the battens for drawing the covering sheet taut over the framework.

3. In a transportable type building structure, a supporting framework including a plurality of vertically arranged inverted U-shaped frame members connected at their bottoms to a pair of base frame members, a flexible synthetic plastic covering sheet overlying the framework and forming the top and side walls of the building structure and having its side edges passing underneath the base frame members into the building structure, said side edges of the covering being formed into sleeves, battens extending through the sleeves, and a plurality of spring coupling members connected at one end through holes in the sleeves to the battens and at their other ends to the U-shaped frame members for drawing the covering sheet taut over the framework.

4. In a transportable type building structure, a supporting framework including a pair of end panels forming the end walls of the building structure and each having a vertically arranged inverted U-shaped frame member, a plurality of vertically arranged inverted U-shaped frame members between the end panels, and a pair of base frame members connected to the bottoms of the U-shaped frame members, a flexible synthetic plastic covering sheet overlying the U-shaped frame members of the framework and forming the top and side walls of the building structure and having its side edges passing underneath the base frame members into the building structure, said side edges of the covering being formed into sleeves, battens extending through the sleeves, and a plurality of spring coupling members connected at one end through holes in the sleeves to the battens for drawing the covering sheet taut over the framework.

5. In a transportable type building structure, a supporting framework including a pair of end panels forming the end walls of the building structure and each having a vertically arranged inverted U-shaped frame member, a plurality of vertically arranged inverted U-shaped frame members between the end panels, and a pair of base frame members connected to the bottoms of the U-shaped frame members, a flexible synthetic plastic covering sheet overlying the U-shaped frame members of the framework and forming the top and side walls of the building structure and having its side edges passing underneath the base frame members into the building structure, said side edges of the covering being formed into sleeves, battens extending through the sleeves, and a plurality of spring coupling members connected at one end through holes in the sleeves to the battens and at their other ends to the U-shaped frame members for drawing the covering sheet taut over the framework.

References Cited in the file of this patent

UNITED STATES PATENTS

| | | |
|---|---|---|
| 1,061,547 | Kennedy et al. | May 13, 1913 |
| 1,581,331 | Smith | Apr. 20, 1926 |
| 2,465,621 | Wheeler | Mar. 29, 1949 |
| 2,696,825 | Lamb | Dec. 14, 1954 |
| 2,702,546 | Gilroy et al. | Feb. 22, 1955 |